United States Patent
Pruss et al.

(10) Patent No.: US 12,384,712 B2
(45) Date of Patent: Aug. 12, 2025

(54) SYSTEMS AND METHOD FOR PRODUCING HOLLOW QUARTZ CYLINDERS

(71) Applicant: MOMENTIVE PERFORMANCE MATERIALS QUARTZ, INC., Strongsville, OH (US)

(72) Inventors: Eugene Pruss, Avon Lake, OH (US); Frederic Ahlgren, Highland Hts., OH (US); Douglas Korwin, Akron, OH (US); Michael Plate, Stade (DE); Theodore Kircher, Pepper Pike, OH (US)

(73) Assignee: MOMENTIVE PERFORMANCE MATERIALS QUARTZ, INC., Strongsville, OH (US)

( * ) Notice: Subject to any disclaimer, the term of this patent is extended or adjusted under 35 U.S.C. 154(b) by 75 days.

(21) Appl. No.: 18/036,791

(22) PCT Filed: Nov. 16, 2021

(86) PCT No.: PCT/US2021/059582
§ 371 (c)(1),
(2) Date: May 12, 2023

(87) PCT Pub. No.: WO2022/104284
PCT Pub. Date: May 19, 2022

(65) Prior Publication Data
US 2023/0416135 A1    Dec. 28, 2023

Related U.S. Application Data

(60) Provisional application No. 63/114,009, filed on Nov. 16, 2020.

(51) Int. Cl.
C03B 19/09    (2006.01)
C03B 5/02    (2006.01)

(52) U.S. Cl.
CPC ............ *C03B 19/095* (2013.01); *C03B 5/025* (2013.01)

(58) Field of Classification Search
CPC .................................................. C03B 19/095
See application file for complete search history.

(56) References Cited

U.S. PATENT DOCUMENTS 3,853,520 A    12/1974    Rau
4,188,201 A *  2/1980    Jung ................. C03B 37/01294
                                                    65/335

(Continued)

OTHER PUBLICATIONS

Patent Cooperation Treaty (PCT), International Search Report and Written Opinion for Application PCT/US2021/059582 filed Nov. 17, 2021, mailed Feb. 25, 2022 International Searching Authority, EP.

(Continued)

*Primary Examiner* — Cynthia Szewczyk
(74) *Attorney, Agent, or Firm* — McDonald Hopkins LLC

(57) ABSTRACT

This disclosure relates to fabrication of quartz hollow cylinder with reduced bubbles using atmospheric control. An example horizontal rotating arc furnace includes a housing, supports, and a rotary union. The housing defines an interior configured to receive silica particles and electrodes that generate a plasma arc and includes a plurality of first ports on an exterior of the housing fluidly connected to the interior and supply pipes fluidly coupled to the first ports. The supports mechanically couple the housing to a drive system to provide rotational motion to the housing. The rotary union is coupled to the housing includes second ports to fluidly connect to a vacuum supply. The second ports are fluidly connected to the first ports via the supply pipes. The horizontal rotating arc furnace is configured to apply a vacuum to the interior of the housing via the first ports when the housing is spinning.

19 Claims, 2 Drawing Sheets

(56) References Cited

U.S. PATENT DOCUMENTS

| | | |
|---|---|---|
| 4,515,352 A | 5/1985 | Fukushima |
| 5,431,560 A | 7/1995 | Helker |
| 2003/0226376 A1 | 12/2003 | Winnen et al. |
| 2015/0052948 A1* | 2/2015 | Lehmann ................ C03B 5/033 |
| | | 65/21.4 |
| 2019/0263703 A1 | 8/2019 | Ludwig et al. |

OTHER PUBLICATIONS

European Office Action for Application No. 21824196.6, dated Oct. 22, 2024, 6 pages, Germany.

* cited by examiner

SYSTEMS AND METHOD FOR PRODUCING HOLLOW QUARTZ CYLINDERS

RELATED APPLICATIONS

This application is a 35 U.S.C. § 371 national stage application of PCT Application No. PCT/US2021/059582 filed on Nov. 17, 2021 which claims priority to U.S. Provisional Application No. 63/114,009, entitled "Systems and Method for Producing Hollow Quartz Cylinders," filed Nov.16, 2020, each of which are herein incorporated by reference in its entirety their entireties.

TECHNICAL FIELD

The present invention is generally related to manufacture of quartz hollow cylinders and more, specifically fabrication of quartz hollow cylinder with reduced bubbles using atmospheric control.

BACKGROUND

Hollow cylinders of silica ($SiO_2$) glass, sometimes described as "fused quartz" or "quartz glass," are used for semiconductor wafer processing. Semiconductor materials are placed inside the cylinder during some processing steps, such as masking, deposition, and etching. Due to the aggressive nature of the etch processes, for example, the etch chamber materials are selected to withstand harsh environments to promote reliable wafer processing. Therefore, the innermost etch chamber components are typically fabricated from quartz glass. Etching of pure quartz glass theoretically results in liberation of only silicon and oxygen species. These are less harmful to the wafer, as compared to transition metals and other elements, which may modify the composition and, therefore the semiconducting properties, of the wafer.

There are a number of methods to produce hollow quartz cylinders. Some examples include spray fusion followed by drilling to form the core, direct draw through a die and core, thermal reflow of an existing cylinder, etc. Still another method of forming cylinders is via a rotating furnace. In this method, sand is generally sprayed into a rotating furnace chamber. The sand is held to the inner surface of the rotating furnace chamber by centrifugal force. Electrodes are then introduced into the chamber. An electric plasma arc between the electrodes provides the heat to fuse the quartz. The sand melts radially from the inner layer of sand (i.e., the sand that is closest to the heat source). The hollow cylinder is then allowed to cool. While these methods are generally suitable to form a quartz cylinder, the cylinders may still exhibit impurities such as bubbles, inclusions, etc. at a concentration that is not sufficient for their intended applications.

SUMMARY

This disclosure relates to fabrication of quartz hollow cylinder with reduced bubbles using atmospheric control. To control the atmosphere within a rotating arc furnace, a cylinder body of the furnace includes ports with porous plugs on the outside of the cylinder body. The ports are fluidly connected to manifolds so that a vacuum can be drawn in the space between the sand grains after the inner surface is fused. In some examples, the two or more sets of ports are fluidly connected respectively to two or more manifolds so that vacuum may be applied to some of the ports and a high diffusivity gas, such as helium, hydrogen, mixtures thereof, etc., may be introduced into the other ports. The flow of the high diffusivity gas may promote the flow of the gas species that cause bubbles to the vacuum ports. The apparatus and system provides a system in which gases that lead to bubble formation may be evacuated from the sand bed prior to fusion. This system and method for fabricating hollow quartz cylinders facilitates production of a quartz material that can be used in semiconductor wafer processing application, such as the etching step, by reducing bubbles formed while fusing the quartz.

The apparatus and system allow for control of the atmosphere and conditions within the cylinder body where the quartz is formed. Prior systems for forming cylindrical quartz tubes did not allow for control of the atmosphere. Once the system was sealed in prior systems, the atmosphere within the sand bed was fixed. The present apparatus and system allow for controlling the atmosphere through a series of ports on the rotating cylinder through which a vacuum can be applied and/or process gases can be introduced. In this manner, conditions can be created within the cylinder that will either prevent bubble formation or result in the reduction of bubble size and/or promote bubbles to escape the glass during processing.

In one aspect, provided a horizontal rotating arc furnace comprising: a housing defining an interior configured to receive particles for forming quartz or ceramic body and electrodes that generate a plasma arc, the housing including a plurality of first ports on an exterior of the housing fluidly connected to the interior and supply pipes fluidly coupled to the first ports; supports mechanically coupling the housing to a drive system to provide rotational motion to the housing; and a rotary union coupled to the housing, the rotary union including second ports to fluidly connect to a vacuum supply, the second ports fluidly connected to at least some of the first ports via the supply pipes, wherein the horizontal rotating arc furnace is configured to apply a vacuum to the interior of the housing via the first ports when the housing is rotating.

In one embodiment, the plurality of first ports comprise a first set of first ports and a second set of first ports, the supply pipes comprise a first set of supply pipes and a second set of supply pipes, the rotary union is a first rotary union, and wherein the horizontal rotating arc furnace further comprises a second rotary union coupled to the housing opposite the first rotary union, the second rotary union including third ports to fluidly connect to a gas supply, the third ports fluidly connected to the second set of first ports via the second set of supply pipes, wherein the second ports are fluidly connected to the first set of first ports via the first set of supply pipes.

In one embodiment, the gas supply supplies a high diffusivity gas.

In one embodiment, the high diffusivity gas is a mixture of helium and oxygen that is at least 80% helium by weight.

In one embodiment, the gas supply is configured to supply a high diffusivity gas to the second set of first ports simultaneously with the vacuum supply applying the vacuum to the first set of first ports.

In one embodiment in accordance with any of the previous embodiments, the horizontal rotating arc furnace further comprises: an axial extension coupled to each end of the housing, wherein the axial extensions rotates with the housing, wherein at least one axial extension is fluidly coupled to the rotary union, and configured to fluidly couple the rotary union to supply pipes, and wherein the rotary union provides a seal between the vacuum source and the at least one axial extension.

In one embodiment, the housing includes a cylinder body in which the particles and the electrodes are received, wherein the axial extensions extend radially away from the cylinder body, and wherein the at least one axial extension interfaces with the drive system within one of the supports to provide rotational force to the housing.

In one embodiment, the housing includes a cylinder body in which the particles and the electrodes are received, wherein the first ports that are spaced about the cylinder body to supply the vacuum to an interior of the cylinder body while remaining balanced to facilitate rotation of the cylinder body.

In one embodiment, in accordance with any of the previous embodiments, the first ports each include a plug sufficient to allow a vacuum to be drawn from or the high diffusivity gas to be introduced in the housing and prevent the particles from entering the first ports.

In one embodiment, the plugs are formed from a porous material having a porosity sufficient to allow a vacuum to be drawn from the housing while preventing the silica particles from entering the first ports.

In another aspect, provide is a method of forming a quartz or ceramic body comprising: supplying quartz or ceramic particles to the horizontal rotating arc furnace of any of the previous embodiments; and while rotating the housing: providing heat to fuse at least a portion of the particles into a quartz or ceramic body, and applying a vacuum between an interior wall of the housing and an exterior wall of the quartz or ceramic body via the plurality of first ports on the housing.

In one embodiment, the particles are quartz particles, and the method comprises forming a quartz body.

In another aspect, provided is a method for forming a silica glass body comprising: supplying silica particles into an interior of a hollow cylinder body of a horizontal rotating arc furnace; and while rotating the hollow cylinder body: providing heat to fuse at least a portion of the silica particles into the silica glass body, and applying a vacuum between an interior wall of the hollow cylinder body and an exterior wall of the silica glass body via a first set of one or more ports on the cylindrical hollow body.

In one embodiment, the method comprises, while rotating the hollow cylinder body, supplying a process gas to the interior of the cylinder via a second set of one or more ports on the cylindrical hollow body.

In one embodiment, applying the vacuum and supplying the process gas are performed simultaneously.

In one embodiment, process gas is a high diffusivity gas.

In one embodiment, the process gas is a mixture of helium and oxygen that is at least 80% helium by weight.

In one embodiment, the method further comprises, while rotating the hollow cylinder body, supplying a process gas to the interior of the cylinder via a second set of one or more ports on the cylindrical hollow body at a first time, wherein applying the vacuum occurs at a second time, and the second time occurs subsequent to the first time.

In one embodiment, the method further comprises, while rotating the hollow cylinder body, supplying a post-process gas to the interior of the cylinder via the second set of one or more ports at a third time, the third time being after the first time

BRIEF DESCRIPTION OF THE DRAWINGS

Operation of the present disclosure may be better understood by reference to the following detailed description taken in connection with the following illustrations, wherein.

DETAILED DESCRIPTION

Figure 1:
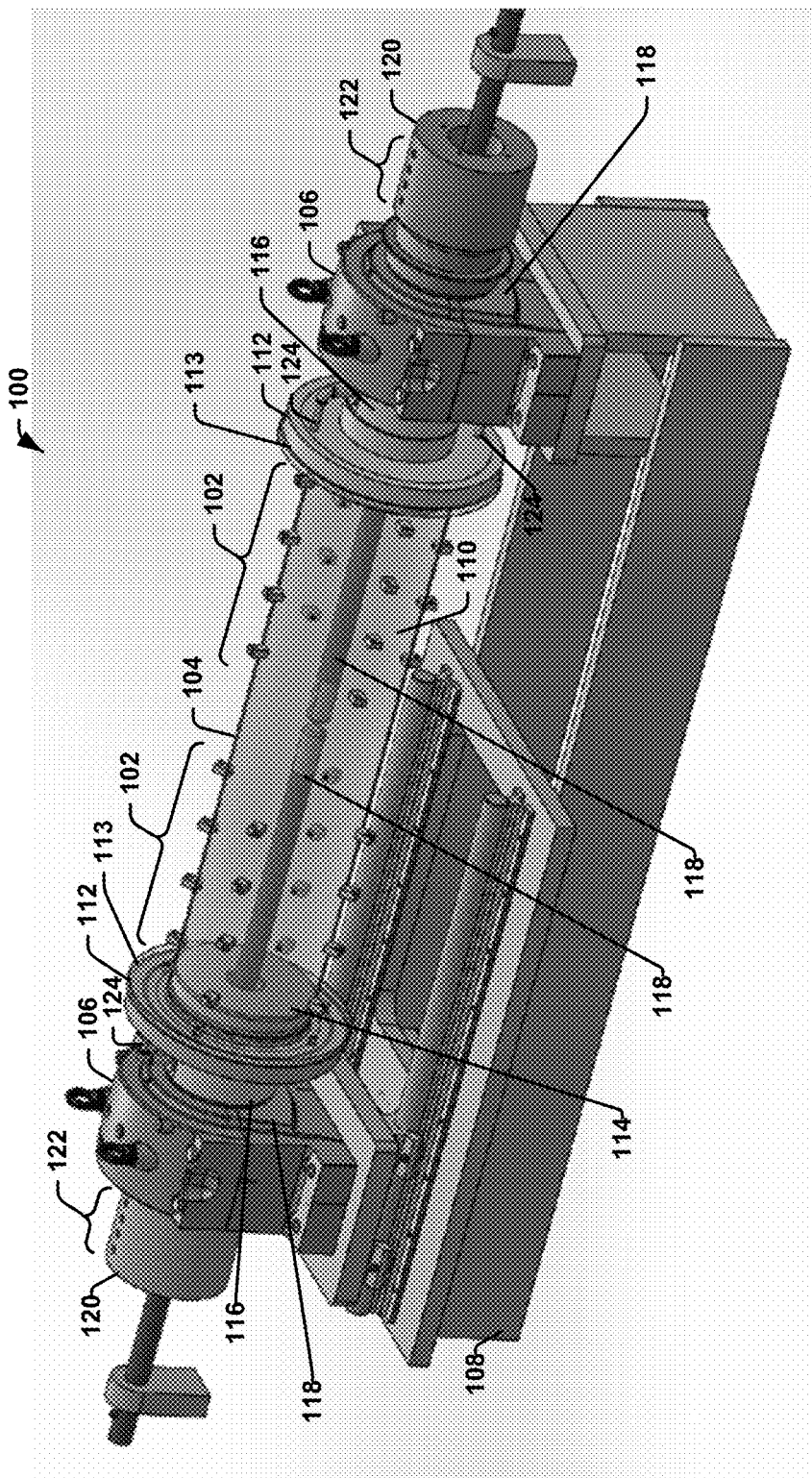
FIG. 1 is a perspective view of a rotating arc furnace with ports in accordance with teachings of this disclosure.

Reference will now be made in detail to exemplary embodiments of the present disclosure, examples of which are illustrated in the accompanying drawings. It is to be understood that other embodiments may be utilized, and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Semiconductor wafer processing for microchip fabrication requires, among other steps, sequential and repeated steps such as masking, deposition, and etching. In the etching step, the wafer and the chamber in which the etching takes place are exposed to an aggressive environment (e.g., the environments for reactive ion etching and plasma etching, etc.). The innermost etch chamber components are fabricated from quartz glass so that etching results in liberation of only silicon and oxygen species. These are less harmful to the wafer, as compared to transition metals and other elements, which would modify the composition and therefore the semiconducting properties of the wafer. To be suitable for etching, quartz components should (i) be as chemically pure as possible (e.g., having less than 50 parts per million by weight (ppmw) total impurities), and (ii) have a very low concentration of bulk defects (e.g., foreign material inclusions and bubbles, etc.). Such bulk defects, when exposed to the etching atmosphere can cause inhomogeneous etching that generates quartz glass particles. Loose particulate matter within the etch chamber may block gates and destroy conductive vias on the wafer or contaminate the wafer with impurity elements.

As described below, a system and method are described to reduce bubbles in quartz hollow cylinders by controlling the atmosphere within a cylinder body of a rotating arc furnace. To control the atmosphere within the rotating arc furnace, a cylinder body of the furnace includes ports with porous plugs on the outside of the cylinder body. The ports are fluidly connected to manifolds so that a vacuum can be drawn in the space between the sand grains after the inner surface of the sand bed is fused. In some examples, the two or more sets of ports are fluidly connected respectively to two or more manifolds. In some such examples, vacuum is applied to one set of ports and high diffusivity gasses, such as helium or hydrogen, etc., are introduced into the other set of ports. This facilitates managing and/or changing the atmosphere inside the unfused quartz sand before, during, and/or after fusing the sand. The flow of the high diffusivity gasses promotes the flow of the gas species that cause bubbles to the vacuum ports; therefore the bubbles leave the fusing sand bed. In some examples, the ports are flush to the interior of the cylindrical body and include a membrane or filter that allows gas to flow and/or vacuum to be applied without letting sand to enter the ports. The ports are distributed on the cylinder body in a balanced manner to facilitate rotation of the cylinder body.

Figure 2:
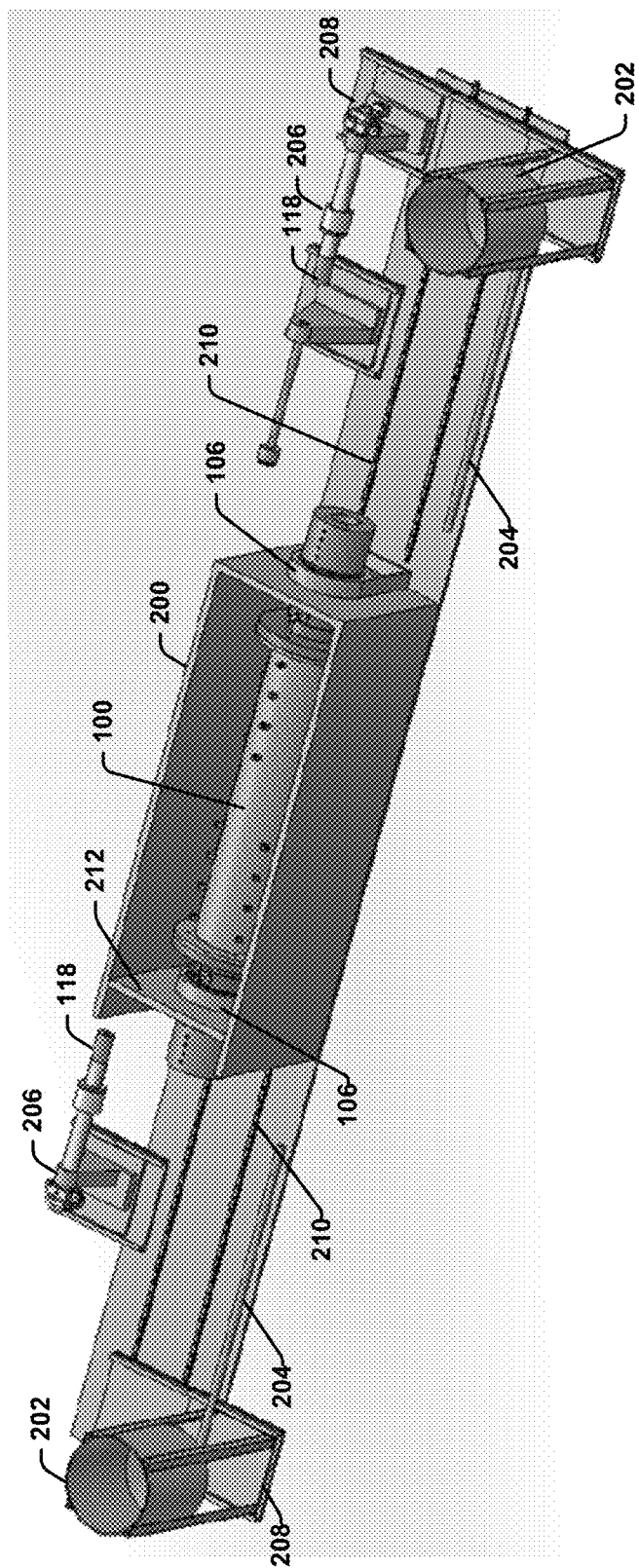
FIG. 2 is a perspective view of a rotating arc furnace assembly in accordance with the teachings of this disclosure.

FIGS. 1 and 2 are perspective views of a rotating arc furnace 100 with ports 102 to facilitate controlling gas in a sand bed (e.g., silica particles). In the illustrated example, the rotating arc furnace 100 is a horizontal rotating arc furnace in which silica is fused into hollow quartz cylinders. While the rotating arc furnace 100 is shown as using plasma arc heating, other suitable heating methods, such as resistance heating, etc., may be used. The rotating arc furnace 100 includes a housing 104 that is supported by supports 106. In the illustrated example, the rotating arc furnace 100 is mounted on a machine bed 108 via the supports 106.

The housing 104 includes a hollow cylinder body 110 and furnace flanges 112. The cylinder body 110 includes the ports 102 that are spaced about the cylinder body 110 to supply a vacuum and/or high diffusivity gas to the interior of the cylinder body 110 while remaining balanced to facilitate spinning of the cylinder body 110. In some examples, the ports 102 are flush with the interior of the cylinder body 110. The ports 102 may each include a plug sufficient to allow a vacuum to be drawn from or the high diffusivity gas to be introduced in the cylinder where plugs prevent or hinder silica particles from entering the ports 102 during the process. The plugs may be formed from a porous material having a porosity sufficient to satisfy these objectives with respect to gas flow and prevention of silica particles escaping the tube and clogging the ports. The material for the plug is not particularly limited and can be selected as desired. In one embodiment, the plug is made from refractory materials, alloys, steel or stainless steel. In some examples, ports 102 facilitate introduction of a gas into the interior of the cylinder body 110 (e.g., in the space between interior of the cylinder body 110 and the fused hollow quartz cylinder).

Each of the furnace flanges 112 includes a flange body 113, a refractory 114 that supports the cylinder body 110, and an axial extension 116 that interfaces with a drive system 118 within the corresponding one of the supports 106. Each refractory 114 extends radially into the interior of the cylinder body 110. In the illustrated example, the outer diameter of the refractories 114 is configured to fit the inner diameter of the cylinder body 110. Each refractory 114 defines a hole along a horizontal central axis though which electrodes 119 and/or silica particles may be introduced. The axial extensions 116 extend radially away from the cylinder body 110 to interface with the drive system 118 within the corresponding one of the supports 106 to provide rotational force to the housing 104. The axial extensions 116 define a hole that is coaxial with the hole defined by the respective refractories 114 to provide access to the interior of the cylinder body 110 to the electrodes 119 and/or silica particles.

Each of the axial extensions 116 is coupled of to a rotary union 120 that provides a seal between a stationary gas supply and/or vacuum source and the rotating axial extension 116. The rotary unions 120 include supply ports 122. In some examples one rotary union 116 may be fluidly coupled to a vacuum source and the other one of the rotary unions 116 may be fluidly coupled to one or more gas supplies. The axial extension 116 is fluidly coupled to the corresponding rotary union 120 and is configured to fluidly couple the rotary union 120 to supply pipes 124 that fluidly couple the axial extension 116 to the flange body 113. The flange body 113 defines passages corresponding to the supply pipes 124 such that the flange body 113 is fluidly connected to the vacuum source and/or the one or more gas supplies via the corresponding axial extension 116 and the corresponding rotary union 120. The passages defined in the flange body 113 are fluidly coupled to the ports 102 to supply vacuum and/or or gas to the interior of the cylinder body 110. In such a manner, vacuum may applied to the radially outer side of molten silica forming into the hollow quartz cylinder while the housing 104 is spinning to promote any bubbles that form in the molten silica to leave via the radially outer side of molten silica.

FIG. 2 illustrates the rotating arc furnace 100 within an assembly housing 200. A feed system (e.g., a pneumatic feed system, etc.) transports silica particles from hoppers 202, though feed tubes 204, into the interior of the rotating arc furnace 100. An arc system 206 provides the electrodes 119 to the interior of the rotating arc furnace 100. In operation, a plasma arc is established between the electrodes 119 to provide heat to fuse the silica particles into fused quartz. In the illustrated example, the hoppers 202 and the arc system 206 are on platforms 208 movable on tracks 210. The platforms 208 and the tracks 210 are configured to move to interchange whether the feed tubes 204 or the electrodes 119 are in the interior of the rotating arc furnace 100. In some examples, one or more of platforms 208 move perpendicular to the tracks to interchange whether the feed tubes 204 or the electrodes 119 are in the interior of the rotating arc furnace 100.

In operation, silica particles are introduced into the interior of the rotating cylinder body 110 (e.g., via the hoppers 202 and the feed tubes 204, etc.). The electrodes 119 are introduced into the interior of the cylinder body 110. In some examples, a high diffusivity gas (e.g., helium, hydrogen, a mixture of helium and oxygen that is at least 80% helium by weight, etc.) is introduced into the interior of the cylinder body 110 via the ports 102 (sometimes referred to as the "processing gas"). The housing 104 rotates, causing the silica particles to the inner wall of the cylinder body 110. An arc is generated between the electrodes 119. The electrodes 119 are then moved apart to their operating positions with the plasma arc between them. The arc heats the silica particles, gradually converting it to a molten (fused) state. The layer of silica particles closest to the arc melts first, with the melt front gradually extending outward, toward the inner wall of the cylinder body 110. After the inner surface of the quartz is fused, a vacuum is drawn in the remaining sand layer. A thin layer of unmolten silica particles remains between the molten silica and the inner wall of the cylinder body 110, which remains in the unmolten state throughout the rest of the processing. In some examples, a high diffusivity gas is introduced into the interior of the cylinder body 110 (sometimes referred to as a "post-processing gas") such that some ports 102 are applying the vacuum and some ports are 102 supplying the post-processing gas. In some examples, the post-processing gas may be a different gas or mixture of gasses than the processing gas. In such examples, flow of the high diffusivity gasses may promote the flow of the gas species that cause bubbles to the vacuum ports.

It will be appreciated that the system allows for or can accommodate tubes of different lengths. In the illustrated example of FIG. 2, the assembly housing 200 includes an adjustable wall 212. The adjustable wall 212 and the corresponding support 106 may be horizontally adjusted to accommodate hollow cylinder bodies 110 of different lengths and/or different port configurations. In such a manner, one hollow cylinder body 110 of one length may be removed and replaces it with a hollow cylinder body 110 of a different length.

The apparatus with the cylinder comprising the ports allows for control of the environment within the system. In the production of a cylindrical silica glass body, the various process conditions with respect to the vacuum applied to the system and/or flowing a processing gas through the system via the ports can be selected as desired for a particular purpose or intended application. The present system and apparatus allow for simultaneously pulling a vacuum at different locations along the length of the rotating cylinder including at opposite ends of the cylinder. In one embodiment, the system is configured to simultaneously pull a vacuum within the system and introduce a process gas into the system. In another embodiment, the introduction of process gas(es) and pulling a vacuum occur at separate times.

The apparatus and system also allow for introducing different process gases at selected times. In one embodiment, helium is introduced as a process gas for a selected period of time, and once the silica begins to glass over, the flow of helium is stopped, and argon is introduced into the system. It will also be appreciated that the system with the various ports allows for the introduction of mixture of process gases at a ratio as desired such as by controlling the flow rate of the respective gases through the ports.

The number of ports provided on the cylinder is generally not limited and can be selected as desired for a particular purpose or to provide particular conditions or properties within the cylinder. The number of ports may affect how the atmosphere within the system can be controlled. A greater number of ports allows for more options in controlling/creating the atmosphere within the cylinder. For example, the number and location of the ports will contribute to where the vacuum is applied, or the process gases are introduced within the cylinder. By increasing the number of ports per unit area, for example, it may allow for a certain level vacuum to be applied across the length of the cylinder and the bed of silica.

In one embodiment, the ports along a first half of the length are connected to apply a vacuum to the system, and the ports along a second half of the length of the cylinder are connected to supply a process gas. The pressure or flow rate of the gas can be controlled as desired.

The apparatus and methods described herein are suitable for forming tubes useful in a variety of applications including, but not limited to the semiconductor industry. The apparatus and system can be employed to make quartz glass cylinders of a selected thickness. In embodiments, the quartz cylinders can have a thickness of from about 1 cm to about 10 cm and an outer diameter of from about 15 cm to about 50 cm.

The type and nature of the starting feed material employed in the process can be selected as desired for a particular purpose or intended application. For making quartz cylinders, the starting material is a silica ($SiO_2$) sand. The silica ($SiO_2$) used in the glass compositions of the present embodiments can be synthetic sand, natural sand, or a mixture thereof. In one embodiment, the amount of $SiO_2$ in the glass composition ranges from about 82 to about 99.9999%. In another embodiment, the amount of $SiO_2$ in the glass composition ranges from about 92 to about 99.9999%; from about 96 to about 99.9999 wt. %; from about 97 to about 99.9999 wt. %; even from about 98 to about 99 wt. %. Here as elsewhere in the specification and claims, ranges can be combined to form new and non-specified ranges. The feed material may also include recycled or broke glass materials (which are also known as and referred to as cullet).

Additionally, while the apparatus and system have been described with respect to making quartz cylinders, it will be appreciated that the apparatus and system can be adapted and employed to make cylinders of other materials including, but not limited to, ceramic or glass-ceramic materials. Ceramic materials can include alumina, zirconia, barium oxide, silicon carbide, silicon nitride, boron nitride, beryllium oxide, titania, calcium oxide, magnesium oxide, combinations of two or more thereof, and the like. Glass-ceramics may include a mixture of ceramic and silica particles.

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A horizontal rotating arc furnace comprising:
a housing defining an interior configured to receive particles for forming quartz or ceramic body and electrodes that generate a plasma arc, the housing including a plurality of first ports on an exterior of the housing fluidly connected to the interior and supply pipes fluidly coupled to the first ports;
supports mechanically coupling the housing to a drive system to provide rotational motion to the housing; and
a rotary union coupled to the housing, the rotary union including second ports to fluidly connect to a vacuum supply, the second ports fluidly connected to at least some of the first ports via the supply pipes,
wherein the horizontal rotating arc furnace is configured to apply a vacuum to the interior of the housing via the first ports when the housing is rotating.

2. The horizontal rotating arc furnace of claim 1, wherein
the plurality of first ports comprise a first set of first ports and a second set of first ports,
the supply pipes comprise a first set of supply pipes and a second set of supply pipes,
the rotary union is a first rotary union, and
wherein the horizontal rotating arc furnace further comprises a second rotary union coupled to the housing opposite the first rotary union, the second rotary union including third ports to fluidly connect to a gas supply, the third ports fluidly connected to the second set of first ports via the second set of supply pipes, wherein the second ports are fluidly connected to the first set of first ports via the first set of supply pipes.

3. The horizontal rotating arc furnace of claim 2, wherein the gas supply supplies a high diffusivity gas.

4. The horizontal rotating arc furnace of claim 3, wherein the high diffusivity gas is a mixture of helium and oxygen that is at least 80% helium by weight.

5. The horizontal rotating arc furnace of claim 2, wherein the gas supply is configured to supply a high diffusivity gas to the second set of first ports simultaneously with the vacuum supply applying the vacuum to the first set of first ports.

6. The horizontal rotating arc furnace of claim 1, further comprising:
an axial extension coupled to each end of the housing, wherein the axial extensions rotates with the housing,
wherein at least one axial extension is fluidly coupled to the rotary union, and configured to fluidly couple the rotary union to supply pipes, and
wherein the rotary union provides a seal between the vacuum source and the at least one axial extension.

7. The horizontal rotating arc furnace of claim 6, wherein the housing includes a cylinder body in which the particles and the electrodes are received, wherein the axial extensions extend radially away from the cylinder body, and wherein the at least one axial extension interfaces with the drive system within one of the supports to provide rotational force to the housing.

8. The horizontal rotating arc furnace of claim 1, wherein the housing includes a cylinder body in which the particles and the electrodes are received, wherein the first ports that are spaced about the cylinder body to supply the vacuum to an interior of the cylinder body while remaining balanced to facilitate rotation of the cylinder body.

9. The horizontal rotating arc furnace of claim 1, wherein the first ports each include a plug sufficient to allow a vacuum to be drawn from or the high diffusivity gas to be introduced in the housing and prevent the particles from entering the first ports.

10. The horizontal rotating arc furnace of claim 9, wherein the plugs are formed from a porous material having a porosity sufficient to allow a vacuum to be drawn from the housing while preventing the silica particles from entering the first ports.

11. A method of forming a quartz or ceramic body comprising:
supplying quartz or ceramic particles the horizontal rotating arc furnace of claim 1; and
while rotating the housing:
providing heat to fuse at least a portion of the particles into a quartz or ceramic body, and
applying a vacuum between an interior wall of the housing and an exterior wall of the quartz or ceramic body via the plurality of first ports on the housing.

12. The method of claim 11, wherein the particles are quartz particles, and the method comprises forming a quartz body.

13. A method for forming a silica glass body comprising:
supplying silica particles into an interior of a hollow cylinder body of a horizontal rotating arc furnace; and
while rotating the hollow cylinder body:
providing heat to fuse at least a portion of the silica particles into the silica glass body, and
applying a vacuum between an interior wall of the hollow cylinder body and an exterior wall of the silica glass body via a first set of one or more ports on the cylindrical hollow body.

14. The method of claim 13 further comprising, while rotating the hollow cylinder body, supplying a process gas to the interior of the cylinder via a second set of one or more ports on the cylindrical hollow body.

15. The method of claim 14, wherein applying the vacuum and supplying the process gas are performed simultaneously.

16. The method of claim 14, wherein the process gas is a high diffusivity gas.

17. The method of claim 16, wherein the process gas is a mixture of helium and oxygen that is at least 80% helium by weight.

18. The method of claim 14, further comprising, while rotating the hollow cylinder body, supplying a process gas to the interior of the cylinder via a second set of one or more ports on the cylindrical hollow body at a first time, wherein applying the vacuum occurs at a second time, and the second time occurs subsequent to the first time.

19. The method of claim 18, further comprising, while rotating the hollow cylinder body, supplying a post-process gas to the interior of the cylinder via the second set of one or more ports at a third time, the third time being after the first time.

* * * * *